Sept. 26, 1950 G. P. KEARSE Re. 23,273

ANTENNA SYSTEM

Original Filed May 18, 1948

Inventor:
George P. Kearse
By
L. F. Hammond
Atty.

Reissued Sept. 26, 1950 Re. 23,273

UNITED STATES PATENT OFFICE 23,273

ANTENNA SYSTEM

George P. Kearse, Chicago, Ill., assignor to American Phenolic Corporation, Chicago, Ill., a corporation of Illinois Original No. 2,474,480, dated June 28, 1949, Serial No. 27,662, May 18, 1948. Application for reissue June 9, 1950, Serial No. 167,167

10 Claims. (Cl. 250—33.65)

Figure 1:
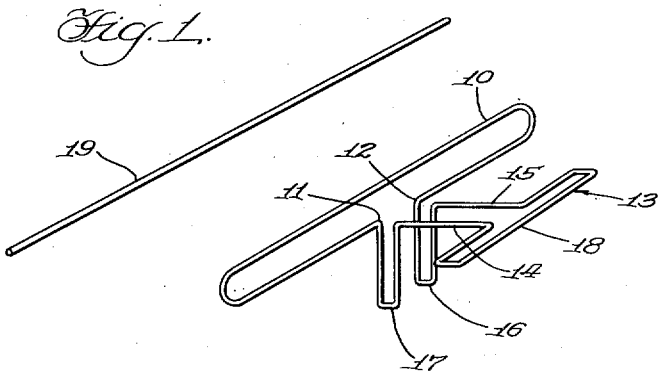

Matter enclosed in heavy brackets [ ] appears in the original patent but forms no part of this reissue specification; matter printed in italics indicates the additions made by reissue

The present invention relates to antenna systems and deals specifically with the problem of providing a television antenna designed for high gain unidirectional performance throughout all of the thirteen television channels.

In introduction, it may be well to point out that throughout the history of radio unceasing attempts have been made to provide antennas capable of high gain performance over a fairly broad band of frequencies. The successful solution of this problem has perplexed communication engineers for many years, but the problem has been greatly complicated by the advent of commercial television, primarily due to the fact that a broadcast signal covers only a few kilocycles of the ether spectrum, while television reception from even a single station requires an antenna system adapted to respond to two separate signals, each having a far greater spectrum width than a broadcast signal.

The magnitude of the task involved begins to become apparent when it is remembered that the video or picture signal of a single television channel covers approximately five hundred times the ether spectrum width of a signal in the broadcast band, and the frequency modulation signal which supplies the sound to the television receiver is about fifteen times as wide. These figures in themselves are staggering, but the full significance of the problem is not appreciated until it is remembered that, to be successful from a commercial standpoint, a television antenna must not only respond to the signals within a single channel but must respond with an equally high degree of performance to any of the thirteen channels presently in use. Further, these thirteen channels are not continuous in the ether spectrum, since the first six channels occupy the frequency range of from 44 to 88 megacycles (with a break from 72 to 76 megacycles for non-Government fixed and mobile applications), while the other seven channels function at a considerably higher frequency and occupy the range of from 174 megacycles to 216 megacycles. The design of a successful television antenna presupposed that it should reject other signals, yet the presence of the standard frequency modulation band (88 to 108 megacycles) between the two groups of television channels even further complicates the problem of satisfactory electrical design.

When the extreme range of frequencies to which the antenna must respond is considered, it will be apparent that the conventional methods of broad banding an antenna structure, as by lowering the Q of the circuit by decreasing the L/D (length to diameter) ratio fall hopelessly short of achieving the desired result, and it has become more or less universal practice to provide a television receiver with a more or less conventional dipole that is deliberately mismatched to the transmission line. This gives a very poor gain at resonance, but the degree of mismatching is greatly reduced on either side of resonance, with the result that a fairly uniform response is achieved across a range of frequencies wide enough to reasonably cover one television channel (6 megacycles). Such an arrangement, however, falls far short of offering a full solution to the problem, since it necessarily fails to produce anything even approaching high gain performance, is incapable of operation over the entire range of 44 to 216 megacycles and does not yield a bidirectional radiation pattern over all of this range. In addition, it is noted that even if satisfactory response over the entire spectrum could be achieved, a conventional antenna of this type would fail to reject the signals in the standard frequency modulation band, which could cause interference with the television signal.

It is accordingly the primary object of the present invention to provide a television antenna system, wherein a single antenna array and conventional twin conductor transmission line may be employed for high gain performance throughout all of the present television channels, and wherein the different components of the antenna are so designed and related as to achieve high gain performance, surpassing the performance of even a resonant dipole and so designed as to discriminate against frequency modulation signals between the upper and lower groups of television channels.

A further object of the invention resides in the provision of an antenna system having the performance characteristics noted above, yet having a pronounced unidirectional pattern, extending substantially unchanged to the full upper and lower limits of the present thirteen frequency bands. The importance of a unidirectional pattern in a television receiving antenna cannot be overstressed, since if the antenna tends to pick up signals other than those emanating directly from the transmitting station, the time interval between signals picked up directly and those reflected will cause reflected signals to produce multiple images or ghosts, as they are called, and cause serious deterioration of the quality of the picture received. It is thus important that the antenna be designed to operate within a beam width of from 60 to 90 degrees, and that its front-to-back and front-to-side ratio be extremely high to reject unwanted signals.

A further object of the invention is to provide an antenna with the electrical characteristics noted, yet so designed that it is inherently matched to a conventional 300 ohm twin lead transmission line without the need of resorting to quarter-wave sections or other matching devices. The importance of this feature is readily apparent when it is remembered that conventional receivers, as now manufactured, are almost invariably matched to a 300 ohm line, and that use of any type of matching section between the line and the antenna necessarily causes the circuit to become frequency sensitive and thus nullifies any broad banding characteristics that the antenna itself might possess.

A further object, and one of considerable importance from a commercial standpoint, resides in the provision of an antenna having the functional characteristics heretofore discussed, and at the same time being of a physical construction such that it is readily capable of mounting on a single rotatable mast and designed in such a manner that it may be commercially manufactured at reasonable cost, and when installed is rugged, durable, capable of withstanding high winds and heavy ice loading, yet having its total weight sufficiently low that it may safely be mounted on any reinforcing.

Figure 2:
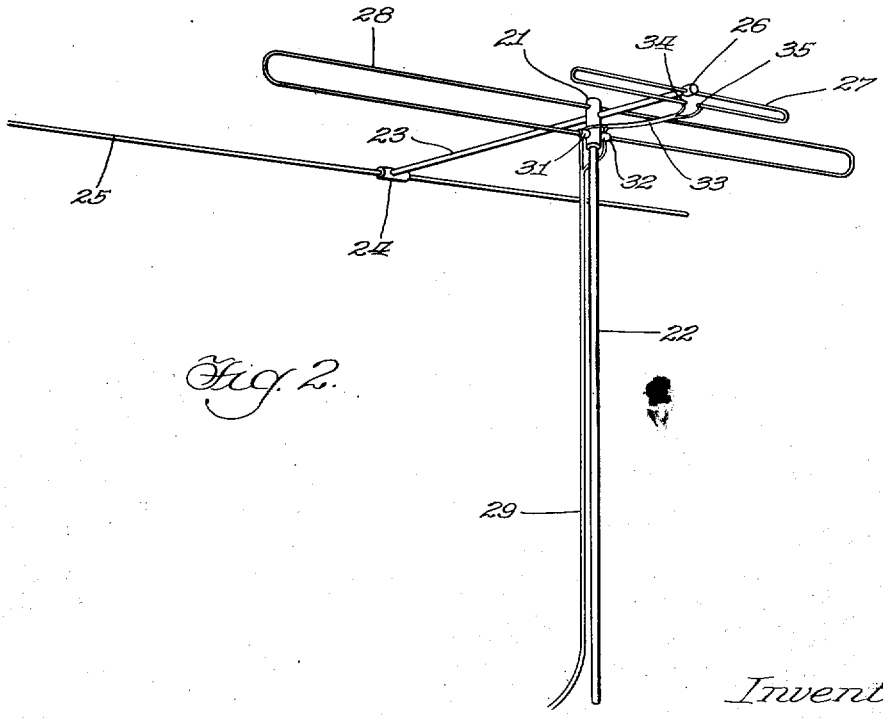

The present invention accomplishes the objects noted by the provision of an antenna system which uses, in combination, a folded dipole connected to the twin leads of a conventional 300 ohm transmission line, together with a reflector spaced from the dipole, and a second folded dipole positioned on the opposite side from the reflector and joined to the first by an additional length of transmission line. The desired results heretofore outlined are achieved by the simple expedient of designing the center dipole for low frequency operation, and using a second dipole suited to operation over the upper group of frequency channels; but calculating the length of the transmission line and the second dipole so that, at low frequencies, the circuit of the second dipole acts as a quarter-wave section, presenting substantially infinite impedance to the low frequency signals and thus preventing the second dipole from interfering with the performance of the first. The manner in which this is accomplished is best illustrated with reference to the drawing of this specification, wherein:

Figure 1 is a diagrammatic view of an antenna system as contemplated by these teachings; and Figure 2 is a perspective view of the preferred commercial embodiment of the invention as presently manufactured.

In the diagrammatic illustration of Figure 1 the dipole 10 is designed to operate over the low frequency group of channels and is adapted to be connected directly to the twin leads of the transmission line at the points 11 and 12. The high frequency dipole 13 is also of folded form and is designed to operate over the upper group of frequency channels.

The ends of the folded dipole 13 are also connected to the transmission line at the points 11 and 12 by conductors 14 and 15, but these conductors include looped sections 16 and 17 so that they are somewhat longer than the actual distance between the dipoles 10 and 13, and the length of the sections 16 and 17 is so calculated that the electrical length between the points 11 and 12 and the midpoint 18 of the high frequency dipole is a quarter-wave length of the mean frequency at which the low frequency dipole 10 operates. Thus the impedance of the high frequency dipole circuit, looking toward it from the points 11 and 12, is extremely high; and it follows that during low frequency operation this circuit acts as a quarter-wave section and prevents the presence of the dipole 13 from interfering with the normal functioning of the dipole 10. The dipole 10 and the reflector 19 then function to provide an efficient unidirectional array. At frequencies in the upper six channels (174 megacycles to 216 megacycles) of the television spectrum, the dipole 10 functions as the reflector for the high frequency dipole 13, so that here again an efficient unidirectional effect is attained. Thus, by the expedient of utilizing one folded dipole as a reflector for the other, it is not only possible to attain high gain performance throughout the entire television spectrum, but it is also possible to accomplish unidirectional characteristics through the entire frequency range by the use of only three elements.

In the commercial embodiment of the invention illustrated in Figure 2, the entire array is mounted on a single fitting 21 at the top of a mast 22. A cross arm 23 extends both forwardly and rearwardly from the mast and carries a back fitting 24 to support the reflector 25, and a front fitting 26 to support the high frequency dipole 27. The low frequency dipole 28 is mounted directly on the fitting 21, and a twin lead 300 ohm transmission line 29 or any suitable radio frequency transmission line is joined to the ends of the dipole 28 at the points 31 and 32. The pair of conductors extending between these points and the second dipole is in this case formed of an additional length of transmission line which extends in a loose loop 33 to the ends 34 and 35 of the high frequency dipole. The transmission line is positioned parallel with the mast 22 but spaced to the rear of the low frequency dipole 28.

Best results are obtained by providing a low frequency dipole 78 inches in length with a 3.25 inch center-to-center distance between its upper and lower spans. The reflector is 98 inches long and is spaced 38.5 inches behind the dipole 28. The high frequency dipole is 29 inches long with 1.5 inch center-to-center distance between its upper and lower spans and is spaced 13.75 inches forwardly of the low frequency dipole. A 300 ohm twin lead transmission line is utilized as the lead in, and it has been learned that with the spacing and the dimensions of the parts given as above, it is unnecessary to form depending sections, such as the sections 16 and 17 of Figure 1, and that excellent results are achieved by merely allowing the section of line 33 to be suspended in a rather loose loop between the points 31—32 and the points 34—35, since in this particular construction the parts are so dimensioned that, at low frequencies, the electrical length between the points 31—32 and the fitting 26 causes the circuit of the dipole 27 to have almost infinite impedance.

Experiments with antenna systems constructed as described above have shown that they are not only efficient from an electrical standpoint, but are also highly satisfactory by reason of their mechanical design. It will be readily seen that an antenna of this type may be easily constructed out of readily available materials, and may be easily oriented so that its unidirectional pattern lies in any direction desired. The structure is inherently strong and rugged, so that it will be capable of withstanding strains due to high winds or excessive ice loading, yet at the same time it can be economically manufactured and conveniently assembled. It follows that it is well suited to commercial sale, and may be installed in any typical installation with ease.

The antenna is capable of achieving high gain performance surpassing even the gain of a resonant diploe, and it effectively discriminates against signals in the frequency modulation channel between the upper and lower groups of television frequencies. It has been learned that the unidirectional pattern of the system is substantially unchanged at all points between the upper and lower limits of operating frequencies, and that the front-to-back and front-to-side ratios are quite high, so that the system responds well to signals coming directly from the transmitter but fails to respond to reflected signals and thus avoids ghost images on the screen of the television receiver.

The form of the invention illustrated and described herein is the preferred embodiment of these teachings, in the form now commercially manufactured. It is shown as an illustration of the inventive concept, however, rather than by way of limitation, and it is pointed out that various modifications and alterations may be indulged in within the scope of the appended claims.

Having thus described the invention, what I claim as new and desire to protect by United States Letters Patent is:

1. In an antenna system, the combination, with a radio frequency transmission line, of a first folded dipole directly joined to the ends of the transmission line; a reflector spaced from the first dipole at one side thereof, and a second folded dipole shorter than the first and on the opposite side of the first; and means for isolating said second dipole from the first dipole at the resonant frequency of the first dipole comprising a pair of conductors joining said second dipole to the transmission line; said conductors being of length greater than the spacing between said first and second dipoles.

2. In an antenna system, the combination, with a radio frequency transmission line, of a first folded dipole directly joined to the end of the transmission line; a reflector spaced from the first dipole at one side thereof, and a second folded dipole shorter than the first and on the opposite side of the first; said second dipole also being joined to the transmission line by a pair of conductors of such length that the sum of the lengths of the conductors and the second folded dipole is substantially equal to a shorted quarter wave length line at the resonant frequency of the first dipole.

3. In an antenna system, the combination, with a radio frequency transmission line, of a pair of folded dipoles comprising a first and second dipole at substantially the same horizontal level and spaced apart from each other whereby one may act as a reflector for the other, and means for isolating said second dipole from the first dipole at the resonant frequency of the first dipole comprising an additional loose loop of transmission line joining said second folded dipole to the transmission line and the first folded dipole.

4. In an antenna system, the combination, with a radio frequency transmission line, of a first dipole directly joined to the ends of the transmission line; a reflector spaced from the first dipole at one side thereof, and a second folded dipole on the opposite side of the first dipole and joined to the transmission line by a pair of conductors of such length that the sum of the lengths of the conductors and the second folded dipole is substantially equal to a shorted quarter wave length *line* at the resonant frequency of the first dipole.

5. In an antenna system, the combination, with a radio frequency transmission line, of a first dipole directly joined to the ends of the transmission line; a second folded dipole at substantially the same horizontal level and on one side of the first dipole and joined to the transmission line by a pair of conductors of such length that the sum of the lengths of the conductors and the second folded dipole is substantially equal to a shorted quarter wave length line at the resonant frequency of the first dipole.

6. In an antenna system, in combination, an untuned radio frequency transmission line, a first folded dipole directly joined to the ends of the transmission line; a reflector spaced from the first dipole at one side thereof and a second folded dipole shorter than the first joined to the transmission line by a pair of conductors of such length that the sum of the lengths of the conductors and the second folded dipole is substantially equal to a shorted quarter wave length line at the resonant frequency of the first dipole; the dipoles being at substantially the same horizontal level and spaced apart from each other whereby one may act as a reflector for the other.

7. A television antenna having a supporting frame consisting of a vertical mast with a horizontal cross arm extending in opposite directions from its upper end; a first folded dipole mounted across the top of said frame, and a radio frequency transmission line directly joined to said first folded dipole; a reflector mounted on one end of the cross arm at substantially the same horizontal level as the first dipole and spaced parallel with and at one side of said first folded dipole; a second folded dipole shorter than the first mounted on the other end of the cross arm parallel with and at substantially the same horizontal level as the reflector and the first folded dipole and spaced from said first folded dipole on the side opposite the reflector; and means for isolating the said second dipole from the first dipole at the resonant frequency of the first dipole comprising an additional loose loop of transmission line joining said second folded dipole to the transmission line and the first folded dipole.

*8. As an article of manufacture, a television antenna comprising, in combination, a relatively long rigid supporting arm; a short folded dipole having closely spaced parallel spans substantially half the length of said arm, with the mid point of one of said spans crossing one end of said arm at right angles thereto; a reflector substantially three times the length of said short dipole and crossing the opposite end of said arm at right angles thereto; and a relatively long folded dipole having closely spaced parallel spans substantially two and one-half times the length of the short folded dipole and parallel with the reflector, with the mid point of one of said spans crossing said horizontal arm at right angles thereto at a point thereon intermediate the positions of said short folded dipole and said reflector, and spaced from said reflector a distance substantially three times the distance of its spacing from the short folded dipole; together with supporting fittings secured at each end of said arm and at the intermediate point thereon for rigidly attaching*

*said reflector and both of said dipoles in fixed angular relationship on said supporting arm, and means for rigidly securing said supporting arm in horizontal position on a vertical mast whereby said reflector and said dipoles may be supported in alignment and at substantially the same horizontal level.*

*9. A two band antenna suitable for selective reception of television or like wide band signals in channels extending over two widely spaced broad high frequency ranges while discriminating against signals of intermediate frequency; the antenna comprising a first folded dipole tuned to a frequency in the low frequency band, a reflector parallel to and at substantially the same horizontal level as the first folded dipole, and a second folded dipole tuned to a frequency in the high frequency band parallel to the first folded dipole and at substantially the same horizontal level as the first folded dipole and the reflector and positioned on the side of the first folded dipole opposite the reflector; with the second folded dipole spaced from the first folded dipole by substantially one-third the spacing between the first folded dipole and the reflector.*

*10. As an article of manufacture, a television antenna comprising, in combination, a first folded dipole; a reflector parallel with and spaced from said first dipole at one side thereof, and a second folded dipole shorter than the first positioned parallel therewith at the same horizontal level as the first and on the opposite side thereof from said reflector; with said second dipole spaced from the first dipole a distance such that the sum of the length of the second folded dipole and the distance between said dipoles is equal to substantially half of the length of the first dipole.*

GEORGE P. KEARSE.

REFERENCES CITED

The following references are of record in the file of this patent or the original patent:

UNITED STATES PATENTS

| Number | Name | Date |
|---|---|---|
| 2,039,295 | Carter | May 5, 1936 |
| 2,255,520 | Schuster | Sept. 9, 1941 |
| 2,268,640 | Brown | Jan. 6, 1942 |
| 2,297,329 | Scheldorf | Sept. 29, 1942 |
| 2,352,977 | Scheldorf | July 4, 1944 |
| 2,452,073 | Schivley et al. | Oct. 26, 1948 |

FOREIGN PATENTS

| Number | Country | Date |
|---|---|---|
| 520,628 | Great Britain | Apr. 30, 1940 |

OTHER REFERENCES

FM and Television, February 1948, page 51 (see Collins antenna).

Amphenol Television Antenna, Model 114–005, manual file I–1.7, American Phenolic Corp., Chicago 50, Ill., March 1, 1948.